(12) United States Patent
Ferrie

(10) Patent No.: US 7,797,702 B1
(45) Date of Patent: Sep. 14, 2010

(54) PREVENTING EXECUTION OF REMOTELY INJECTED THREADS

(75) Inventor: Peter Ferrie, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1375 days.

(21) Appl. No.: 11/064,923

(22) Filed: Feb. 22, 2005

(51) Int. Cl.
G06F 9/46 (2006.01)
G06F 11/30 (2006.01)
G06F 9/26 (2006.01)

(52) U.S. Cl. .................. 718/101; 713/188; 711/202

(58) Field of Classification Search ......... 718/100–101; 711/202; 713/188
See application file for complete search history.

(56) References Cited

U.S. PATENT DOCUMENTS

| | | | | |
|---|---|---|---|---|
| 6,738,926 | B2 * | 5/2004 | Mathiske et al. | 714/15 |
| 6,760,861 | B2 * | 7/2004 | Fukuhara et al. | 714/4 |
| 6,816,874 | B1 * | 11/2004 | Cotner et al. | 707/204 |
| 6,907,520 | B2 * | 6/2005 | Parady | 712/228 |
| 7,093,100 | B2 * | 8/2006 | Bridges et al. | 711/207 |

OTHER PUBLICATIONS

Chase, Jeffrey S., et al., "Sharing and Protection in a Single-Address-Space Operating System", ACM Transactions on Computer Systems, vol. 12, No. 4 (Nov. 1994), pp. 271-307.
Jain, K. et al., "User-Level Infrastructure for System Call Interposition: A Platform for Instruction Detection and Confinement", (1999). Iowa and New York.
Shinagawa, Takahiro et al., "Exploiting Segmentation Mechanism for Protecting against Malicious Mobile Code", Technical Report 00-02, Department of Information Science, Faculty of Science, University of Tokyo (May 17, 2000). Tokyo, Japan.
"Thread Local Storage", Microsoft Developer Network, [online] [Retrieved on Sep. 30, 2005] Retrieved from the Internet: <msdn.microsoft.com/library-en- us/dllproc/base/thread_ local_storage. asp?frame=true>.
"Using Thread Local Storage", Microsoft Developer Network, [online] [Retrieved on Sep. 30, 2005] Retrieved from the Internet: <msdn.microsoft.com/library/en-us/dllproc/base/using_ thread_local_storage.asp?frame=true>.
"Using Thread Local Storage in a Dynamic-Link Library", Microsoft Developer Network, [online] [Retrieved on Sep. 30, 2005] Retrieved from the Internet: <msdn.microsoft.com/library/en-us/dllproc/base/using_thread_local_storage_in_a_dynamic_link_library. asp>.

* cited by examiner

Primary Examiner—Meng-Ai An
Assistant Examiner—Camquy Truong
(74) Attorney, Agent, or Firm—Fenwick & West LLP

(57) ABSTRACT

A legitimate process utilizes thread local storage (TLS) functionality to prevent a malicious thread from executing in its address space. The legitimate process includes a thread white list that identifies the entry point addresses of threads executed by the process. When executed on a computer, the process interacts with the TLS functionality provided by the computer's operating system. The operating system sends the process a message each time a new thread is executed in the process's address space. Upon receiving the message, the process determines the entry point address of the new thread and checks to see if the address is in the white list. If the thread entry point address is not in the white list, the thread is probably malicious and the process therefore terminates the thread's execution.

16 Claims, 3 Drawing Sheets

PREVENTING EXECUTION OF REMOTELY INJECTED THREADS

BACKGROUND OF THE INVENTION

1. Field of the Invention

This invention pertains in general to computer security and techniques for defending against computer viruses and other forms of malicious software, and in particular to detecting and preventing injection of malicious threads into a legitimate process's address space.

2. Description of the Related Art

Software programs executed by modern computers are called "processes." Each process performs a particular task, such as providing email messaging or supporting a computer peripheral, and a computer can run multiple processes simultaneously. The computer runs each process within its own virtual address space, which allows each process to utilize a large block of seemingly-contiguous memory for its processing. A process can run sub-processes, called "threads," within its address space.

Some operating systems, such as variants of MICROSOFT WINDOWS, allow a process to read from and write to another process's address space. This functionality is used by certain programs, such as debuggers, where a process executing in one address space needs to gain insight into the operation of a process in another address space. In addition, the ability of one process to read another process's address space allows two processes to share private information without making the information visible to other processes executing on the computer. Some processes, such as those running with high-level security, have restrictions that prevent other processes from manipulating their address spaces. However, most common and frequently-used applications, such as email programs and web browsers, lack any such restrictions on their address spaces.

Unfortunately, allowing one process to manipulate the address space of another process can have negative consequences. A malicious process can use this functionality to compromise legitimate processes. In one attack scenario, a malicious process initially executes unbeknownst to the end-user as part of a Trojan horse, virus, or worm. The process queries the operating system to determine the other processes running on the computer, and identifies a legitimate process that is likely to have network access, such as the web browser. The malicious process next uses the operating system functionality to insert malicious code into the legitimate process's address space and launches the code as a thread of the legitimate process.

Because the malicious thread executes in a legitimate process's address space, it can perform malicious actions that might otherwise be blocked. For example, a firewall can prevent most processes executing on the computer from accessing a network. However, the firewall permits certain processes, such as the web browser, to access the network. The malicious process can thus defeat the firewall by launching the malicious thread in the web browser's address space. Once the malicious thread has network access, it can perform myriad other malicious tasks such as sending confidential information over the network, participating in a coordinated denial of service attack, downloading other malicious software, etc.

There is no easy way for a legitimate process to detect whether a malicious thread is executing in its address space. A process can be configured to periodically check its address space and perform an accounting of the executing threads, but this technique can miss a malicious thread that executes and terminates in the interval between the checks. Another attempted solution relies on using special processes having elevated operating system privileges, such as kernel-mode drivers, to monitor the other processes for malicious behavior. However, there is no guarantee that the operating system vendor will allow third-party processes to execute with the elevated privileges. Other solutions require special code to be loaded into the address space of the process being protected, which can cause unexpected results and/or interfere with the correct operation of the process. Moreover, the malicious process can avoid detection by using obscure function calls or non-standard techniques to launch the malicious thread.

Thus, there is a need in the art for a way to prevent a malicious process from executing a malicious thread in the address space of a legitimate process. Ideally, the solution to this need would not require kernel-mode drivers or other special functionality that might be disallowed or interfere with the legitimate process.

BRIEF SUMMARY OF THE INVENTION

The above need is met by utilizing the thread local storage (TLS) functionality that is provided by the operating system to determine when a new thread is being executed. In one embodiment, a computer program, is designed to take advantage of the TLS features provided by variants of the MICROSOFT WINDOWS operating system. The computer program also includes a thread white list that identifies the entry point addresses of threads that are executed by the program.

When the program is executed, the resulting process receives a message from the TLS functionality in the operating system each time a thread is executed in its address space. Upon receiving such a message, the process determines the entry point address of the thread and determines whether the address is in the thread white list. If the thread entry point address is not in the white list, the thread is probably malicious and the process therefore terminates the thread's execution If the entry point address is in the list, the process allows the thread to execute.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
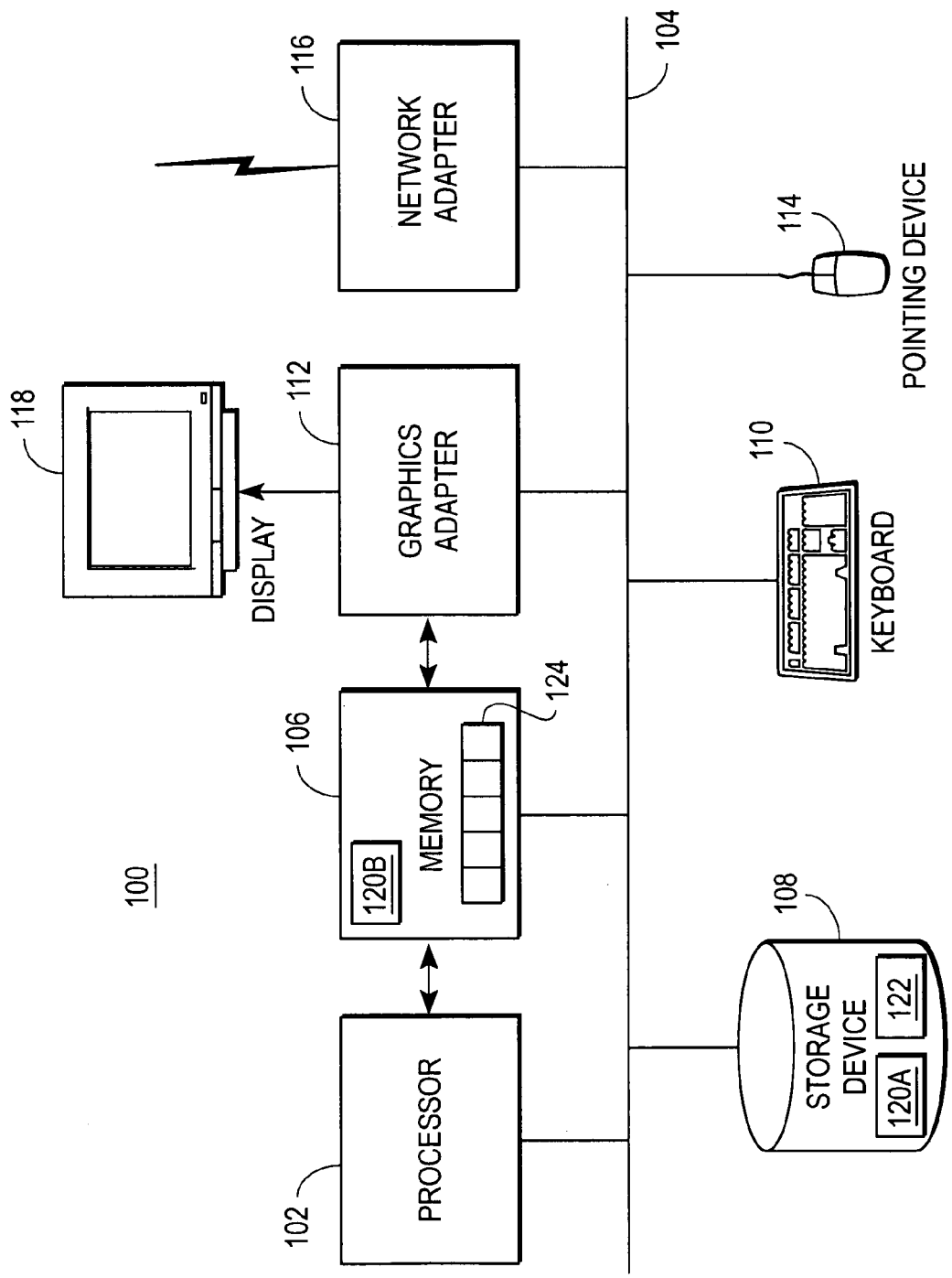
FIG. 1 is a high-level block diagram of a computer.

FIG. 1 is a high-level block diagram of a computer 100. In one embodiment, the computer is a conventional computer and is utilized by an end-user to perform conventional tasks, such as operating as a web server and/or acting as a word processor. FIG. 1 illustrates that the computer 100 has a processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112. Computers acting in different roles may have different and/or additional elements than the ones shown in FIG. 1. For example, a computer 100 acting as a web server might have greater processing power and a larger storage device than a computer system acting as a client workstation. Likewise, a computer system acting as a web server might lack devices such as a display 118 and/or keyboard 110 that are not necessarily required to operate it.

The processor 102 is a general-purpose processor such as an INTEL x86, SUN MICROSYSTEMS SPARC, or POWERPC compatible-CPU. In one embodiment, the memory 106 is a random access memory (RAM), but can also include or other types of memory such as firmware, read-only memory (ROM), and non-volatile random access memory (NVRAM). The memory 106 holds instructions and data used by the processor 102. The pointing device 114 is a mouse, track ball, pressure sensitive pad or other type of pointing device, and is used in combination with the keyboard 110 to input data into the computer 100. The graphics adapter 112 displays images and other information on the display 118. The network adapter 116 couples the computer system 100 to a network such as the Internet. The storage device 108 is a hard disk drive and/or another device capable of storing data, such as a solid-state memory device.

As is known in the art, the computer 100 is adapted to execute computer programs. The computer programs and/or functional components of the programs are referred to herein as "modules." In one embodiment, the modules are stored as executable files and/or in other formats on the storage device 108. When utilized, the modules are loaded into the memory 106 and executed by the processor 102.

The computer 100 is controlled by an operating system (OS) 120 module (referred to herein as simply "the OS"). The OS 120 provides functionality that allows other programs to execute (i.e., run) on the computer 100. In one embodiment, the OS 120 is a variant of the WINDOWS OS available from MICROSOFT CORP. of Redmond, Wash. For example, the OS can be WINDOWS XP, WINDOWS NT, WINDOWS 2000, and the like. Other embodiments utilize a different OS, such as variants of the UNIX OS.

FIG. 1 illustrates the OS 120 in both the storage device 108 and the memory 106. The OS in the storage device is designated by the reference numeral 120A while the instance of the OS in the memory 106 is designated by the reference numeral 120B. In one embodiment, the OS 120 contains multiple discrete modules that can be independently loaded from the storage device 108 into the memory 106 as may be necessary or desired.

FIG. 1 also illustrates other computer programs 122 stored on the storage device 108. The computer programs 122 represent a set of programs that are stored as executable files (e.g., of file type .EXE or .DLL) on the storage device 108 of a typical computer. The exact nature of the programs depend upon how the computer 100 is used. For example, a computer 100 operating as a web server will contain one or more programs for performing that function. Similarly, a computer 100 operating as a home computer will typically contain applications for email messaging, web browsing, instant messaging, etc.

Generally, when a program 122 is executed by the computer 100, the OS 120 loads the program 122 into the memory 106 and runs the program from there. An instance of a program 122 running on the computer 100 is referred to as a "process" and is identified in FIG. 1 using reference numeral 124. One program 122 can be executed as multiple separate process instances. The OS 120 itself is also formed of multiple executing processes.

The OS 120 executes each process 124 in a separate virtual address space. The address space is a series of addresses that the process can utilize to hold data for its own processing. The virtual address space appears to the process 124 as a large contiguous area of memory 106, though in reality the OS might map the address space to non-contiguous portions of the memory 106 or even to the storage device 108. FIG. 1 illustrates multiple processes 124 in the memory 106, with each process having a separate address space.

A process 124 can execute one or more threads in its address space. A thread is a portion of the process 124 that can run independently and concurrently with other portions of the process. Each thread has an associated entry point function that is utilized by the process 124 to launch an instance of the thread. The entry point function points to the address of the first instruction of the thread. This address is fixed in the executable file and has an equivalent fixed address in the virtual address space in which the process is executing.

Malicious software can exploit the computer architecture described above to execute malicious threads in a legitimate process's address space. As used herein, the term "malicious" refers to software that is executing surreptitiously on the computer 100 or that has functionality that is unknown to the end-user. Examples of malicious software are computer viruses, worms, spyware, etc. Such software can be used by an attacker to compromise security on the computer 100 and perform malicious actions such as infecting other computers, capturing data (e.g., passwords or credit card numbers), participating in coordinated denial-of-service attacks, etc. "Legitimate" software, in contrast, is software that is supposed to be executing on the computer.

Under one attack, a malicious process executing on the computer 100 uses the ReadProcessMemory( ) function provided by the OS 120 to examine the address space of a legitimate process and identify a free block of memory large enough to hold malicious code. The malicious process next uses the WriteProcessMemory( ) function to write the malicious code into the free block in the legitimate process's address space. Once the code is copied, the malicious process calls the CreateRemoteThread( ) function and provides it with the address of the malicious code. If left unchecked, this function call launches a malicious thread in the legitimate process's address space.

Figure 2:
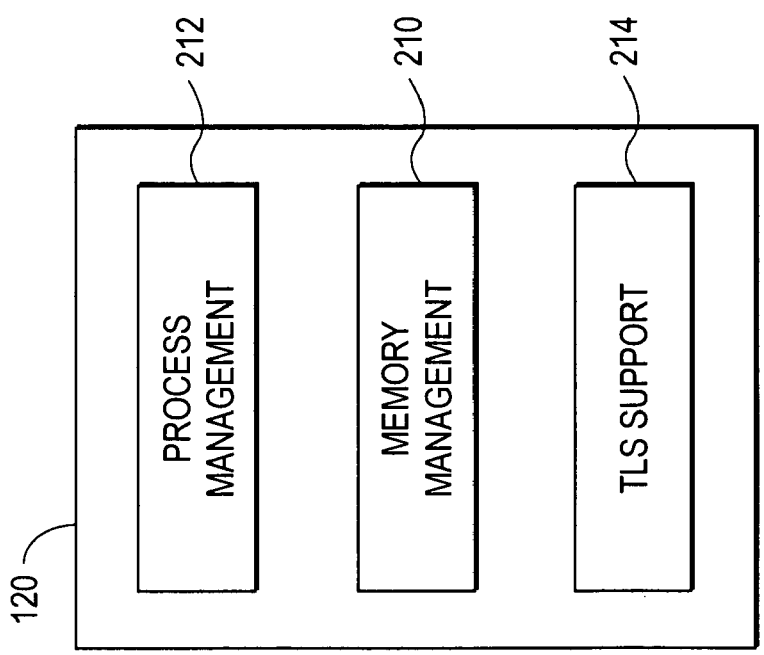
FIG. 2 is a high-level block diagram illustrating functional modules provided by the operating system according to one embodiment.

FIG. 2 is a high-level block diagram illustrating functional modules provided by the OS 120 according to one embodiment. As mentioned above, the computer 100 can utilize a variety of different operating systems. FIG. 2 illustrates modules that are common to many operating systems. Those of skill in the art will understand that particular operating systems can have different and/or other modules than the ones described herein, and that the functionalities can be distributed among the modules in a manner different than described herein.

The OS 120 includes a memory management module 210 for managing use of memory 106 in the computer system 100. In one embodiment, the memory management module 210 manages both real and virtual memory. The memory management module 210 provides each process 124 with a large virtual address space dedicated to that process's use. The memory management module 210 supports functions such as ReadProcessMemory( ) and WriteProcessMemory( ), described above, and malloc( ), which a process 124 can use to request memory.

The OS 120 also includes a process management module 212 that interacts with the memory management module 210 and manages the execution of processes 124. The process management module 212 provides functionality including launching processes 124, associating processes with particular users of the computer 100, setting the priorities of the processes, and/or terminating processes. In one embodiment, the process management module 212 supports the CreateRemoteThread( ) function described above as well as functions that allow processes 124 to launch threads in their own address spaces.

In one embodiment, the OS 120 includes a thread local storage (TLS) support module 214 that interacts with the other modules in the OS and allows each thread of a process to store unique data that the process 124 can access using a global index. In one embodiment, one thread allocates the index, which can then be used by the other threads to retrieve the unique data associated with the index. The TLS support module 214 is including in MICROSOFT WINDOWS-based operating systems, and equivalent functionality may be present in other operating systems.

The TLS support module 214 includes a facility for notifying a process 124 when a new thread is created in the process's address space. In one embodiment, when a process 124 calls a function to launch a thread in a remote process's address space, such as CreateRemoteThread( ) the TLS support module 214 utilizes a callback function to provide the remote process with a message indicating that a new thread has been created in its address space. The TLS support module 214 sends this message before calling the entry point of the thread, thereby giving the remote process a chance to perform any housekeeping functions before the thread is actually executed. The TLS support module 214 provides this message every time a new thread is created, regardless of the particular functional call and/or other technique that is used to start the thread. Therefore, a malicious process cannot avoid generating the message by using a non-standard technique to execute the malicious thread.

Figure 3:
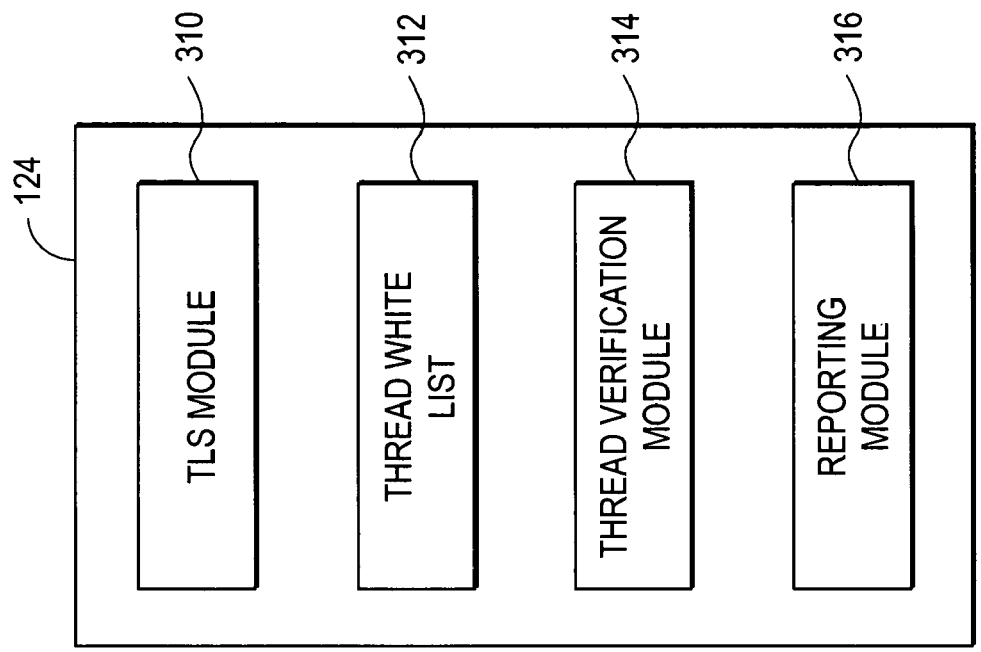
FIG. 3 is a high-level block diagram illustrating modules within a process according to one embodiment.

FIG. 3 is a high-level block diagram illustrating modules within a process 124. FIG. 3 illustrates modules that are common to each process 124 according to one embodiment of the present invention. In other embodiments, the functionalities can be distributed among the modules in a manner different than described herein. Those of skill in the art will recognize that a typical process 124 will have modules in addition to or instead of the ones shown in FIG. 3, such as modules for performing the specific utility for which the process is designed.

The process 124 includes a TLS module 310 for interacting with the TLS support module 214 of the OS 120 and enabling TLS support. The TLS module 310 receives the message from the TLS support module 214 that indicate that a new thread is being created. The process 124 also includes a thread white list module 312 that stores a white list identifying the legitimate threads of the process 124. In one embodiment, the thread white list module 312 contains a list of entry point addresses for all threads that are utilized by the process 124. In one embodiment, the entry point address is the hexadecimal address of the first instruction of the thread, such as 0x402080 or 0x404142. The entry point The white list can be created when the executable file for the process is created (i.e., at compile time), by analyzing the compiled program, or through another technique. The white list is stored in a particular order and/or data structure, such as a hash table, that allows a rapid determination of whether a given entry point is in the list.

A thread verification module 314 determines the entry point of the newly-created thread and determines whether the entry point is stored in the thread white list. In one embodiment, the module calls the NtQuerySystemInformation( ) application program interface (API) provided by MICROSOFT WINDOWS and passes it the SystemProcessesAndThreadsInformation option. In response, the OS 120 provides a list of existing threads, and a list of the thread identifiers for the process 124. For each thread, the thread verification module 314 calls the NtOpenThread( ) API to gain access to the thread, then calls NtQueryInformationThread( ) and passes the ThreadQuerySetWin32StartAddress option in response to which the OS 120 provides the entry point of the thread. If the entry point is present in the white list, then the thread is presumed to be a legitimate thread of the process 124. If the entry point is not present in the white list, then the thread is presumed to be malicious.

In one embodiment, a reporting module 316 receives the results of the thread verification module 314 and responds accordingly. Depending upon the embodiment, the reporting module 316 can be configured to allow legitimate threads to execute while terminating malicious threads using the TerminateThread( ) function or another technique. The reporting module 316 can also be configured to provide a dialog box to the end-user indicating that a malicious thread has been detected and requesting the user's input on whether to execute the thread. In one embodiment, the reporting module 316 reports the result of the thread verification module 314 to a security module (not shown) executing as part of the OS 120 or as a separate process on the computer 100. The security module can perform additional steps, like initiating a virus scan of the process 124 or computer 100 and/or limiting the computer resources (e.g., network access) available to the affected process.

In one embodiment, the functionality of some or all of the modules illustrated in FIG. 3 are integrated into the process 124 at the time it is initially developed. For example, a computer programmer can add code to the computer program during development that instantiates the modules when the program is executed. In another embodiment, some or all of the functionality of the modules of FIG. 3 are implemented by modules of other processes executing on the computer system, such as by the OS 120 or by an application process. Thus, the thread white list module 312 can be incorporated into the program at the time of development, while the TLS module 310, thread verification module 314 and/or reporting module 316 can be incorporated into the OS 120 or other software utilized on the computer 100. In one embodiment, the thread white list is produced by third party analysis of the executable program, and is distributed and maintained separate from the program to which it pertains.

Figure 4:
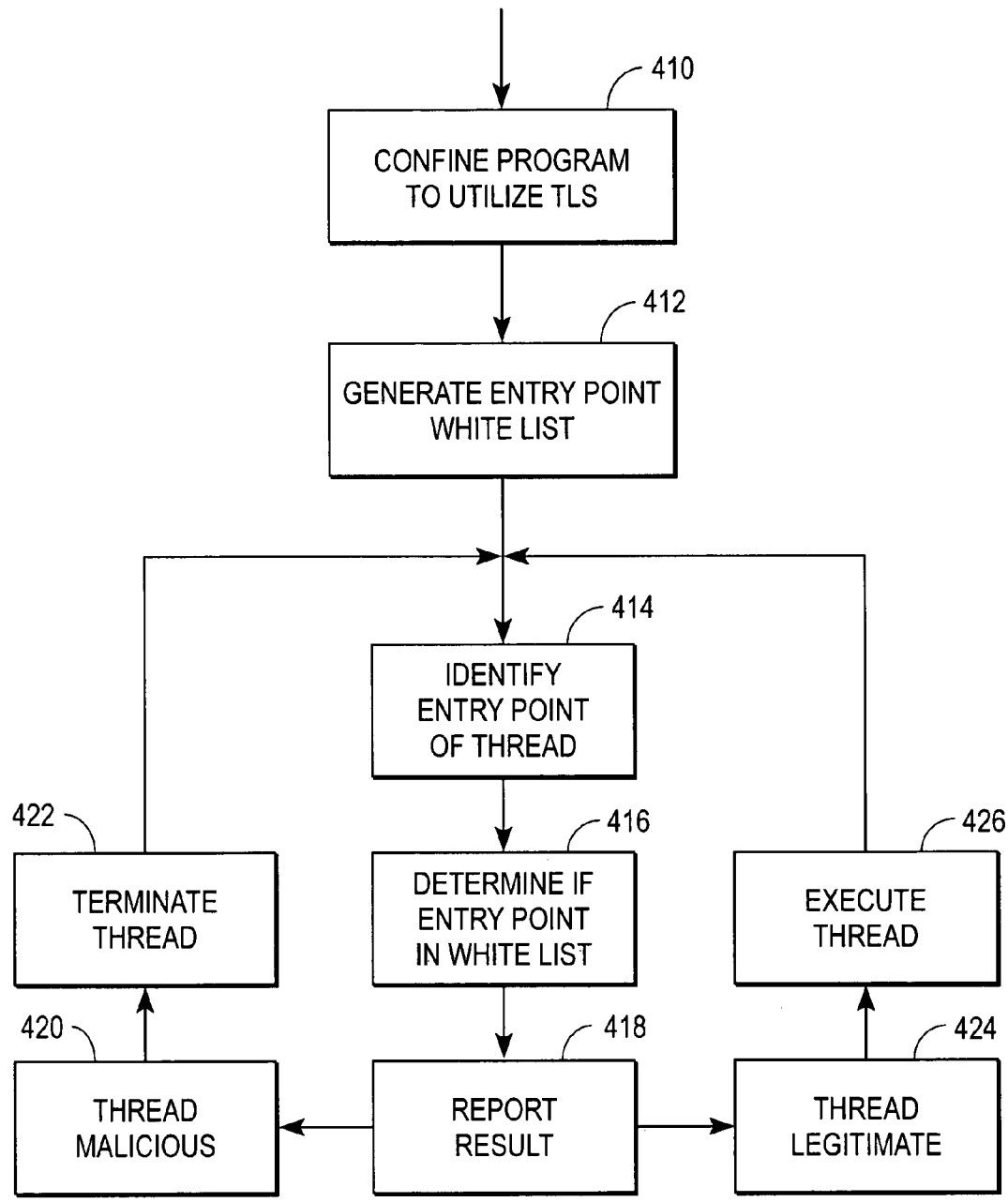
FIG. 4 is a flow chart illustrating steps performed to prevent malicious threads from executing on a computer according to one embodiment.

FIG. 4 is a flow chart illustrating steps performed to prevent malicious threads from executing on a computer 100 according to one embodiment. Some embodiments perform different steps in addition to, or instead of the ones described herein. The steps can also be performed by entities other than the ones named below. Furthermore, the order of the steps can vary.

A computer program 122 is configured 410 to utilize the TLS functionality provided by the OS 120. In one embodiment, this step 410 is performed by coding specific functionality into the program 122 during development. In addition, the white list of legitimate thread entry points is generated 412. In one embodiment, the white list is generated 412 during development. For example, the white list can be populated when the program 122 is compiled. In another embodiment, the white list is generated 412 at another time, such as through a third-party analysis of a previously developed program. The white list is associated with the computer program 122 by, for example, incorporating the white list into the file holding the program or storing the white list in an accessible external location.

At some point the computer program 122 is loaded into the memory 106 of the computer 100 and executed as a process 124. The process 124 utilizes the TLS functionality and receives a message from the OS 120 indicating that a thread has been created in its address space. The process 124 identifies 414 the entry point of the thread and determines 416 whether the entry point is in the white list. The process 124 reports 418 the result of this determination.

If the thread entry point is not in the white list, the thread is probably malicious 420. Therefore, in one embodiment the process 124 terminates 422 the thread to prevent it from executing. If the thread entry point is in the white list, the thread is probably legitimate 424. Accordingly, the process 124 allows the thread 426 to execute. The process 124 can continue to monitor for new threads until the process terminates. In this manner, malicious threads are detected and terminated before the threads can perform any malicious actions.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A method of preventing execution of a thread in an address space of a process executing on a computer, comprising:
    using the computer to perform steps comprising:
        establishing a list of legitimate threads executable by the process, the list identifying legitimate threads using fixed entry point addresses of the legitimate threads in the address space of the process, wherein a fixed entry point address of a legitimate thread identified by the list comprises an address of a first instruction of the legitimate thread;
        receiving a message indicating that a new thread has been created in the address space of the process;
        determining an entry point address of the new thread in the address space of the process;
        determining whether the new thread is in the list of legitimate threads by comparing the entry point address of the new thread to the fixed entry point addresses of the legitimate threads in the list; and
        responsive to a determination that the new thread is not in the list, preventing execution of the new thread.

2. The method of claim 1, further comprising:
    configuring the process to utilize thread local storage functionality of an operating system executing on the computer, wherein the thread local storage functionality provides the message indicating that the new thread has been created.

3. The method of claim 1, further comprising:
    responsive to a determination that the new thread is in the list, allowing execution of the new thread.

4. The method of claim 1, further comprising:
    reporting a result of the determination of whether the new thread is in the list of legitimate threads.

5. The method of claim 1, wherein the fixed entry point address of the legitimate thread identified by the list comprises a hexadecimal address of the first instruction of the legitimate thread.

6. The method of claim 1, wherein the address space of the process is a virtual address space.

7. The method of claim 1, wherein the legitimate threads include software known to be non-malicious.

8. The method of claim 1, wherein establishing the list of legitimate threads comprises:
    analyzing an executable file for the process to identify the fixed entry point addresses of the legitimate threads.

9. A system for preventing execution of a thread in an address space of a process executing on a computer, comprising:
    a non-transitory computer-readable storage medium storing executable modules comprising:
        a thread list module holding a list of legitimate threads executable by the process, the list identifying legitimate threads using fixed entry point addresses of the legitimate threads in the address space of the process, wherein a fixed entry point address of a legitimate thread identified by the list comprises an address of a first instruction of the legitimate thread;
        a message module for receiving a message indicating that a new thread has been created in the address space of the process;
        a thread verification module for determining an entry point address of the new thread in the address space of the process and for determining whether the new thread is in the list of legitimate threads by comparing the entry point address of the new thread to the fixed entry point addresses of the legitimate threads in the list; and
        a reporting module for preventing execution of the new thread responsive to a determination that the new thread is not in the list; and
    a processor for executing the modules stored by the computer-readable storage medium.

10. The system of claim 9, wherein the message module is adapted to utilize thread local storage functionality of an operating system executing on the computer, wherein the thread local storage functionality provides the message indicating that the new thread has been created.

11. The system of claim 9, wherein the reporting module is adapted to allow execution of the new thread responsive to a determination that the new thread is in the list.

12. The system of claim 9, wherein the reporting module is adapted to report the determination of whether the new thread is in the list of legitimate threads.

13. A non-transitory computer-readable storage medium having encoded therein executable computer program instructions for preventing execution of a thread in an address space of a process executing on a computer, comprising:
    a thread list module for holding a list of legitimate threads executable by the process, the list identifying legitimate threads using fixed entry point addresses of the legitimate threads in the address space of the process, wherein a fixed entry point address of a legitimate thread identified by the list comprises an address of a first instruction of the legitimate thread;
    a message module for receiving a message indicating that a new thread has been created in the address space of the process;
    a thread verification module for determining an entry point address of the new thread in the address space of the process and for determining whether the new thread is in the list of legitimate threads by comparing the entry point address of the new thread to the fixed entry point addresses of the legitimate threads in the list; and a reporting module for preventing execution of the new thread responsive to a determination that the new thread is not in the list.

14. The computer-readable storage medium of claim 13, wherein the message module is adapted to utilize thread local storage functionality of an operating system executing on the computer, wherein the thread local storage functionality provides the message indicating that the new thread has been created.

15. The computer-readable storage medium of claim 13, wherein the reporting module is adapted to allow execution of the new thread responsive to a determination that the new thread is in the list.

16. The computer-readable storage medium of claim 13, wherein the reporting module is adapted to report the determination of whether the new thread is in the list of legitimate threads.

* * * * *